United States Patent
Lu et al.

(10) Patent No.: US 12,530,825 B2
(45) Date of Patent: Jan. 20, 2026

(54) METHOD AND APPARATUS FOR SCATTER ESTIMATION IN COMPUTED TOMOGRAPHY IMAGING SYSTEMS

(71) Applicant: CANON MEDICAL SYSTEMS CORPORATION, Tochigi (JP)

(72) Inventors: Yujie Lu, Vernon Hills, IL (US); Liang Cai, Vernon Hills, IL (US); Jian Zhou, Buffalo Grove, IL (US)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 312 days.

(21) Appl. No.: 18/332,237

(22) Filed: Jun. 9, 2023

(65) Prior Publication Data
US 2024/0412426 A1  Dec. 12, 2024

(51) Int. Cl.
*G06T 11/00* (2006.01)
*G01N 23/046* (2018.01)
(Continued)

(52) U.S. Cl.
CPC .......... *G06T 11/005* (2013.01); *G01N 23/046* (2013.01); *G06T 3/4046* (2013.01);
(Continued)

(58) Field of Classification Search
CPC ... G06T 11/005; G06T 3/4046; G06T 7/0002; G06T 2207/10081; G06T 2207/20081;
(Continued)

(56) References Cited

U.S. PATENT DOCUMENTS 6,256,367 B1  7/2001  Vartanian
10,342,504 B2  7/2019  Star-Lack et al.
(Continued)

FOREIGN PATENT DOCUMENTS

CN  113362404 A  8/2021
EP  3 688 723 B1  12/2021

OTHER PUBLICATIONS

Heesin Lee, et al., A Deep Learning-Based Scatter Correction of Simulated X-ray Images, Electronics 2019, 8, 944; doi:10.3390/electronics8090944. www.mdpi.com/journal/electronics. 18 pgs.
(Continued)

*Primary Examiner* — Jonathan S Lee
(74) *Attorney, Agent, or Firm* — Oblon, McClelland, Maier & Neustadt, L.L.P.

(57) ABSTRACT

A method for scatter estimation in a CT including a detector having multiple detector pixels includes: obtaining projection data by scanning an imaging object; reconstructing image data from the projection data; estimating, based on the projection data, a first scatter distribution; selecting, based on the first scatter distribution, a first subset of the pixels; calculating, based on the projection data and the image data, a second scatter distribution with respect to the selected first subset, the second scatter distribution having higher accuracy than the first scatter distribution; acquiring, based on the second scatter distribution, a third scatter distribution with respect to a second subset of the pixels, the third scatter distribution having higher spatial resolution than the second scatter distribution.

18 Claims, 7 Drawing Sheets

(51) Int. Cl.
  *G06T 3/4046* (2024.01)
  *G06T 7/00* (2017.01)
(52) U.S. Cl.
  CPC ...... *G06T 7/0002* (2013.01); *G01N 2223/401* (2013.01); *G06T 2207/10081* (2013.01); *G06T 2207/20081* (2013.01); *G06T 2207/20084* (2013.01)
(58) Field of Classification Search
  CPC ........ G06T 2207/20084; G01N 23/046; G01N 2223/401
  USPC .......................................................... 382/131
  See application file for complete search history.

(56) References Cited

U.S. PATENT DOCUMENTS

| | | | |
|---|---|---|---|
| 2010/0046898 | A1 | 2/2010 | Maltz et al. |
| 2020/0234471 | A1* | 7/2020 | Lu .......................... G06T 11/005 |
| 2021/0335023 | A1* | 10/2021 | Qi .......................... G06T 11/008 |
| 2023/0274473 | A1* | 8/2023 | Hua .......................... G06T 5/70 382/131 |

OTHER PUBLICATIONS

Sun, M., and J. M. Star-Lack. "Improved scatter correction using adaptive scatter kernal superposition." *Physics in medicine and biology* 55.22 (2010): 6695. 27 pgs.

Zou, Yu, et al. "A physics-based fast approach to scatter correction for large cone angle computed tomographic systems." *Nuclear Science Symposium and Medical Imaging Conference (NSS/MIC), 2011 IEEE.* IEEE, 2011. 4 pgs.

Zbijewski, Wojciech, and Freek J. Beekman. "Efficient Monte Carlo based scatter artifact reduction in cone-beam micro-CT." *IEEE transactions on medical imaging* 25.7 (2006): 817-827.

Sun. Mingshan, et al. "Rapid scatter estimation for CBCT using the Boltzmann transport equation." *SPIE Medical Imaging*. International Society for Optics and Photonics, 2014. 9 pgs.

W. Yao and K. W. Leszczynski, "An analytical approach to estimating the first order X-ray scatter in heterogeneous medium," Med. Phys. 36. 3145-3156 (2009), 13 pgs.

Xu S. Prinsen P. Wiegert J, Manjeshwar R. Deep residual learning in CT physics: scatter correction for spectral CT. In 2017 IEEE Nuclear Science Symposium and Medical Imaging Conference (NSS/MIC) Oct. 21, 2017 (pp. 1-3), IEEE.

Maier J, Berker Y, Sawall S, Kachelrieß M. Deep scatter estimation (DSE): feasibility of using a deep convolutional neural network for real-time x-ray scatter prediction in cone-beam CT. In Medical imaging 2016: physics of medical imaging Mar. 9, 2018 (vol. 10573, p. 105731L). International Society for Optics and Photonics, 7 pgs.

Jiang Y, Yang C, Yang P, Hu X, Lua C, Xue Y, Xu L, Hu X, Zhang L, Wang J, Shong K. Scatter correction of cone-beam CT using a deep residual convolution neural network (DRCNN), Physics in Medicine & Biology. Jul. 11, 2019;64(14):145003, 16 pgs.

* cited by examiner

METHOD AND APPARATUS FOR SCATTER ESTIMATION IN COMPUTED TOMOGRAPHY IMAGING SYSTEMS

FIELD

The present disclosure relates to scatter estimation and correction in computed tomography (CT) imaging systems, in which the estimation can be performed by a cascaded neural network framework to increase the accuracy and reduce the processing time.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In general, an X-ray projection image contains many scattered radiation components. Inefficient scatter compensation tends to degrade and bias the projection as well as the reconstructed CT images. This effect leads to inaccurate CT numbers, decreased image contrast, and artifact generation. In a cone-beam CT imaging system with a wide beam geometry, scatter correction can become even more important for maintaining the diagnostic value of the CT examination.

Basically, there are two different approaches to deal with X-ray scatter in CT imaging: scatter suppression and scatter estimation. For example, a two-dimensional detector, such as a flat-panel detector deployed in a CT apparatus, can use hardware-based scatter rejection means (e.g., anti-scatter grids, air gaps, etc.) to suppress scattered radiation. Another way to correct scattered radiation is to estimate the scatter signal in the measured data and eliminate it using software based post-processing.

For example, deep-learning-based methods have shown their unique performance in CT scatter estimation and correction. Such methods can achieve more accurate scatter estimation compared with the traditional kernel method, and faster processing speed compared with physical-model-based methods, such as the Monte Carlo method and the radiative transfer equation (RTE) method.

However, typical deep learning methods directly use the measured projection data as the input of a trained convolutional neural network to estimate a scatter distribution. Although the projection data can be used to reconstruct images revealing the structure of the imaging object, it is not suitable to derive information representing the distribution of the scattered radiation. As a result, the scatter estimation and correction suffer from insufficient accuracy.

Therefore, it is desirable to address these and other deficiencies of current approaches.

SUMMARY

The present disclosure relates to a method for performing scatter estimation in a computed tomography (CT) system. The CT system includes a detector having a plurality of detector pixels. The method includes obtaining projection data by scanning an imaging object using the CT system, and reconstructing image data from the obtained projection data. The method also includes estimating, based on the obtained projection data, a first scatter distribution. The method further includes selecting, based on the estimated first scatter distribution, a first subset of the plurality of detector pixels. The method further includes calculating, based on the obtained projection data and the reconstructed image data, a second scatter distribution with respect to the selected first subset of the plurality of detector pixels. The calculated second scatter distribution has higher accuracy than the estimated first scatter distribution. The method further includes acquiring, based on the calculated second scatter distribution, a third scatter distribution with respect to a second subset of the plurality of detector pixels, so that the acquired third scatter distribution has higher spatial resolution than the calculated second scatter distribution, where the second subset includes the first subset.

The disclosure additionally relates to an apparatus for performing scatter estimation in a computed tomography (CT) system. The CT system includes a detector having a plurality of detector pixels. The apparatus includes processing circuitry configured to obtain projection data by scanning an imaging object using the CT system, and reconstruct image data from the obtained projection data. The processing circuitry is also configured to estimate, based on the obtained projection data, a first scatter distribution. The processing circuitry is further configured to select, based on the estimated first scatter distribution, a first subset of the plurality of detector pixels. The processing circuitry is further configured to calculate, based on the obtained projection data and the reconstructed image data, a second scatter distribution with respect to the selected first subset of the plurality of detector pixels. The calculated second scatter distribution has higher accuracy than the estimated first scatter distribution. The processing circuitry is further configured to acquire, based on the calculated second scatter distribution, a third scatter distribution with respect to a second subset of the plurality of detector pixels, so that the acquired third scatter distribution has higher spatial resolution than the calculated second scatter distribution, where the second subset includes the first subset.

Note that this summary section does not specify every embodiment and/or incrementally novel aspect of the present disclosure or claimed invention. Instead, the summary only provides a preliminary discussion of different embodiments and corresponding points of novelty. For additional details and/or possible perspectives of the disclosure and embodiments, the reader is directed to the Detailed Description section and corresponding figures of the present disclosure as further discussed below.

BRIEF DESCRIPTION OF THE DRAWINGS

Various embodiments of the present disclosure that are proposed as examples will be described in detail with reference to the following figures, wherein like numerals reference like elements, and wherein.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting.

For example, the order of discussion of the different steps as described herein has been presented for clarity's sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present disclosure can be embodied and viewed in many different ways.

Furthermore, as used herein, the words "a," "an," and the like generally carry a meaning of "one or more," unless stated otherwise.

Figure 1:
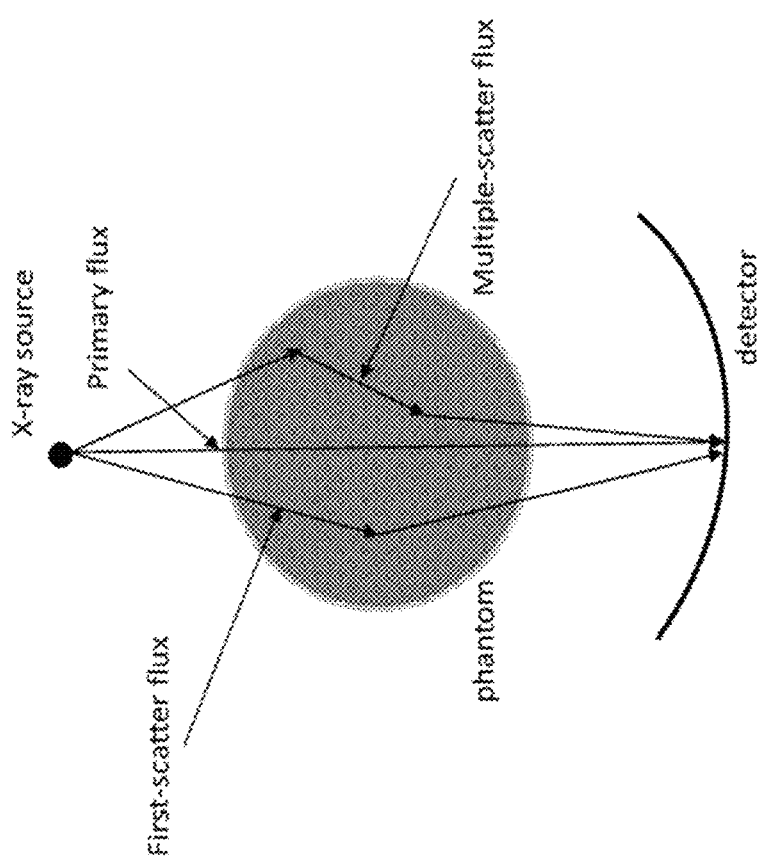
FIG. 1 shows an exemplary process in which X-rays are transmitted with attenuation and scatter through an imaging object to a detector at which both primary flux and scatter flux are detected.

FIG. 1 shows an exemplary process in which X-rays are transmitted with attenuation and scatter through an imaging object to a detector at which both primary flux and scatter flux are detected. As shown in FIG. 1, the imaging object can be a phantom, or in clinical applications, the imaging object can be a patient. The primary flux includes the X-rays that are not scattered. In addition to the primary flux, the detector also detects first-order scatter flux, which includes X-rays, each of which has undergone a single scattering event. Further, the detector also detects multiple-scatter flux, which includes X-rays, each of which has undergone multiple scattering events. For example, the multiple scatter flux can include second-order scatter flux (corresponding to X-rays have been scattered two times), third-order scatter flux (corresponding to X-rays that have been scattered three times), and even higher-order scatter flux (corresponding to X-rays that have been scattered four or more times).

As mentioned above, in a scatter compensation scheme based on deep learning, if the neural network is end-to-end trained to infer the scatter distribution from the measured projection data, accuracy of the scatter estimation is limited. To obtain a more accurate estimation, a first-order scatter distribution can be calculated precisely, and then used as an input to a trained neural network to obtain a total scatter distribution.

Figure 2:
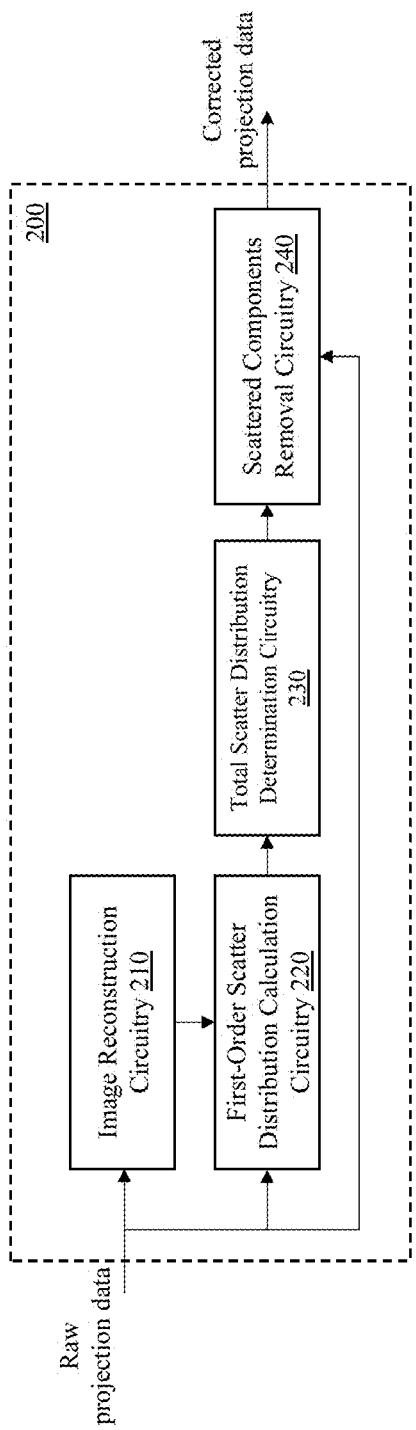
FIG. 2 shows a non-limiting example of a block diagram of scatter compensation circuitry that estimates a scatter distribution with improved accuracy, according to one embodiment of the present disclosure.

FIG. 2 shows a non-limiting example of a block diagram of scatter compensation circuitry 200, according to one embodiment of the present disclosure. The scatter estimation circuitry 200 includes image reconstruction circuitry 210, first-scatter distribution calculation circuitry 220, total scatter distribution determination circuitry 230, and scattered components removal circuitry 240. The image reconstruction circuitry 210 reconstructs image data from the measured projection data, and sends the image data to the first-order scatter distribution calculation circuitry 220. Based on the projection data and the reconstructed image data, the first-order scatter distribution calculation circuitry 220 calculates a first-order scatter distribution using a physical-process-based model. The total scatter distribution determination circuitry 230 receives the first-order scatter distribution from the first-order scatter distribution calculation circuitry 220, and determines a total scatter distribution. Based on the total scatter distribution determined by the total scatter distribution determination circuitry 230, the scatter correction circuitry 240 performs scatter correction by removing the scattered components from the projection data.

Figure 3:
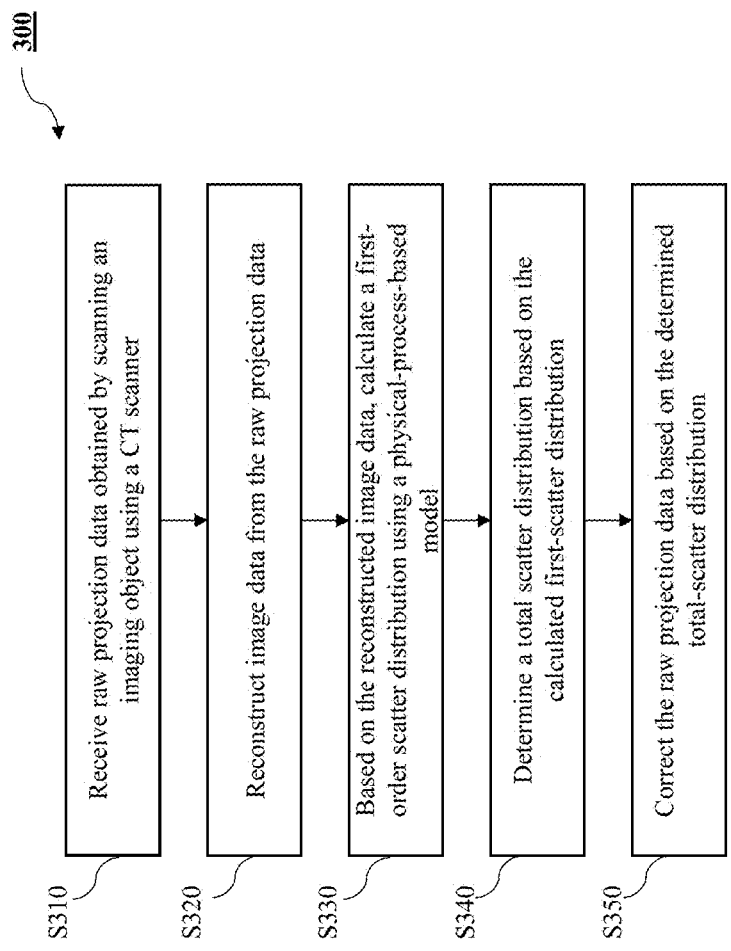
FIG. 3 shows a non-limiting example of a flow chart of a scatter compensation process that estimates a scatter distribution with improved accuracy, according to one embodiment of the present disclosure.

FIG. 3 shows a non-limiting example of a flow chart of a scatter compensation process 300, according to one embodiment of the present disclosure. The process 300 starts in step S310 by receiving the raw projection data obtained by scanning the imaging object using the CT apparatus. The raw projection data can be sinogram data generated from the CT scan, for example.

In Step S320, image data is reconstructed from the received projection data. The reconstructed image data can provide various information regarding the imaging object, which will be used in calculation of the first-order scatter distribution. As an example, the filtered back-projection (FBP) method can be used in the image reconstruction. Note that this is not restrictive, as there are other possible reconstruction methods.

In step S330, the first-order scatter distribution is calculated based on the projection data and the reconstructed image data. For example, the first-order scatter distribution, which is a distribution of first-scatter flux, can be accurately simulated using a physical-process-based model. The physical-process-based model can be expressed using a radiative transfer question (RTE) given by $$\hat{\Omega} \cdot \nabla \psi(\vec{r}, E, \hat{\Omega}) + \mu(\vec{r}, E)\psi(\vec{r}, E, \hat{\Omega}) = \int\int d\hat{\Omega}' dE' f(\vec{r}, E, E', \hat{\Omega} \cdot \hat{\Omega}')\psi(\vec{r}, E', \hat{\Omega}'),$$

which is subject to the boundary condition $$\psi(\vec{r}_c, E, \hat{\Omega}) = \psi_c(\vec{r}_c, E, \hat{\Omega}), \text{ for } \hat{n} \cdot \hat{\Omega} < 0,$$

where $\psi(\vec{r}, E, \hat{\Omega})$ is the specific intensity of photon flux at a point $\vec{r}$, E is an energy, and $\hat{\Omega}$ is a unit vector in the direction of propagation for the photon flux. In the boundary condition, the intensity $\psi_c(\vec{r}_c, E, \hat{\Omega})$ depends on the X-ray source and, if a bowtie filter is used to collimate the X-ray source, on the bowtie scattering. Further, the vector $\vec{r}_c$ indicates a point on the surface of the imaging object, $\hat{n}$ is the normal direction to the boundary surface, and $f(\vec{r}', E, E', \hat{\Omega} \cdot \hat{\Omega}')$ is the scatter cross section, which includes both Compton scattering and Rayleigh scattering for an X-ray CT. Finally, the variable $\mu(\vec{r}, E)$ represents the total attenuation coefficient for the X-rays at the point $\vec{r}$ and the energy E.

The above RTE can be solved to calculate a precise scatter solution, based on the raw CT projection data obtained and various other parameters. Those parameters can include X-ray source spectrum, CT geometry, voxel-based phantom/tissue geometry information, and scatter cross-section and total attenuation of different materials. For example, the voxel-based phantom/tissue geometry information can be derived from the CT image data reconstructed using the uncorrected projection data. Various other input parameters, such as the scatter cross-section and the total attenuation of different materials, can be derived or extrapolated from a combination of the reconstructed image and prior knowledge about the imaging object. Additionally, certain of the parameters, such as the X-ray source spectrum and the CT geometry, can be measured beforehand during calibrations or obtained from known specifications of the CT apparatus.

For example, the first-order scatter distribution $\Phi_{1s}(\vec{r}_D, E)$ with respect to the detector pixels included in the detector of the CT apparatus can be calculated as $$\Phi_{1S}(\vec{r}_D, E) =$$
$$\int\int d\hat{\Omega} \int_{\vec{r}_c}^{\vec{r}_D} d\vec{r}' \int\int d\hat{\Omega}' dE' f(\vec{r}', E, E', \hat{\Omega} \cdot \hat{\Omega}') \psi_c(\vec{r}_c, E', \hat{\Omega}')$$
$$\exp\left[-\int_{\vec{r}_c}^{\vec{r}'} d\vec{r}'' \mu(\vec{r}'', E)\right] \exp\left[-\int_{\vec{r}'}^{\vec{r}_D} d\vec{r}'' \mu(\vec{r}'', E)\right],$$

where $\vec{r}_D$ is the location of the detector pixels.

Although the first-order scatter distribution is calculated above using the RTE method, this is non-restrictive. Other methods, including but not limited to, physical-model-based methods such as the Monte Carlo method, can be used, as long as they can provide a precise calculation.

In step S340, a total scatter distribution is determined based on the calculated first-scatter distribution. This determination can be performed by a trained neural network. The calculated first-scatter distribution is inputted into the neural network, and an output of the neural network is obtained as the total scatter distribution. Training datasets of the neural network can be collected from simulation, research experiments on phantoms or volunteers, and/or clinical procedures on patients. For example, physical-model-based simulation, such as simulation based on the RTE method or the Monte Carlo method, can be conducted with the CT apparatus to generate different first-order scatter distributions and their corresponding total scatter distributions. By training the neural network with the collected data, a mapping between the different first-order scatter distributions and the corresponding total scatter distributions can be learned.

In step S350, the raw projection data can be corrected based on the total scatter distribution determined in step S340.

As mentioned above, the first-order scatter distribution is the distribution of the first-order component of the scattered radiation detected by the detector of the CT apparatus. This component results from single-scattering events in the imaging object. The first-order scatter distribution is a close approximation of the total scatter distribution. The total scatter distribution can be inferred with improved accuracy from the precisely calculated first-order scatter distribution.

While in the embodiment depicted in FIGS. 2 and 3, the first-order scatter distribution is calculated to obtain the total scatter distribution, it is feasible for those skilled in the art to achieve a more accurate determination of the total scatter distribution, by using a distribution of the first-order component and one or more higher-order components. This could include a distribution of the first- and second-order scattered components, or of the first-, second-, and third-order scattered components, etc.

Figure 4:
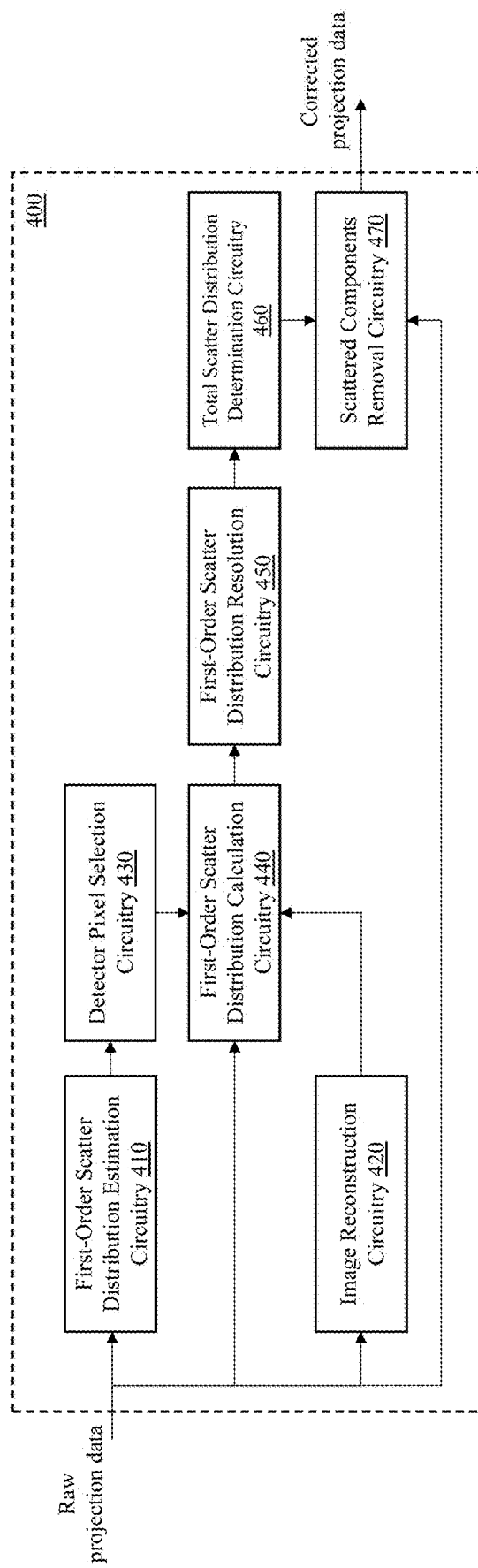
FIG. 4 shows a non-limiting example of a block diagram of scatter compensation circuitry that estimates a scatter distribution with improved accuracy and reduced processing time, according to one embodiment of the present disclosure.

In one embodiment of the present disclosure, a cascaded neural network framework is designed for the purposes of further accelerating the above scatter compensation process. FIG. 4 shows a non-limiting example of a block diagram of scatter compensation circuitry 400 that estimates a scatter distribution with improved accuracy and reduced calculation time, according to one embodiment of the present disclosure.

The scatter distribution estimation circuitry 400 includes first-order scatter distribution estimation circuitry 410, image reconstruction circuitry 420, detector pixel selection circuitry 430, first-order scatter distribution calculation circuitry 440, first-order scatter distribution resolution circuitry 450, total scatter distribution determination circuitry 460, and scattered components removal circuitry 470.

The first-order scatter distribution estimation circuitry 410 receives the raw projection data, estimates and sends a first-order scatter distribution to the detector pixel selection circuitry 430. The image reconstruction circuitry 420 reconstructs image data from the projection data, and sends the reconstructed image data to the first-order scatter distribution calculation circuitry 440.

Based on the estimated first-order scatter distribution, the detector pixel selection circuitry 430 selects a subset of a plurality of detector pixels included in the detector of the CT apparatus. Using a physical-model-based method, the first-order scatter distribution calculation circuitry 440 calculates, with respect to the detector pixels in the selected subset, a first-order scatter distribution.

The first-order scatter distribution resolution circuitry 450 receives the first-order scatter distribution calculated by the first-order scatter distribution calculation circuitry 440, and resolves a first-order scatter distribution with respect to the plurality of detector pixels of the detector.

Based on the first-order scatter distribution resolved by the first-order scatter distribution resolution circuitry 450, the total scatter distribution determination circuitry 460 determines a total scatter distribution. The scattered components removal circuitry 470 conducts scatter correction based on the total scatter distribution determined by the total scatter distribution determination circuitry 460. Note that the total scatter distribution determination circuitry 460 is optional and can be omitted. In this case, the scattered components removal circuitry 470 can conduct scatter correction directly using the first-order scatter distribution from the first-order scatter distribution resolution circuitry 450.

Figure 5:
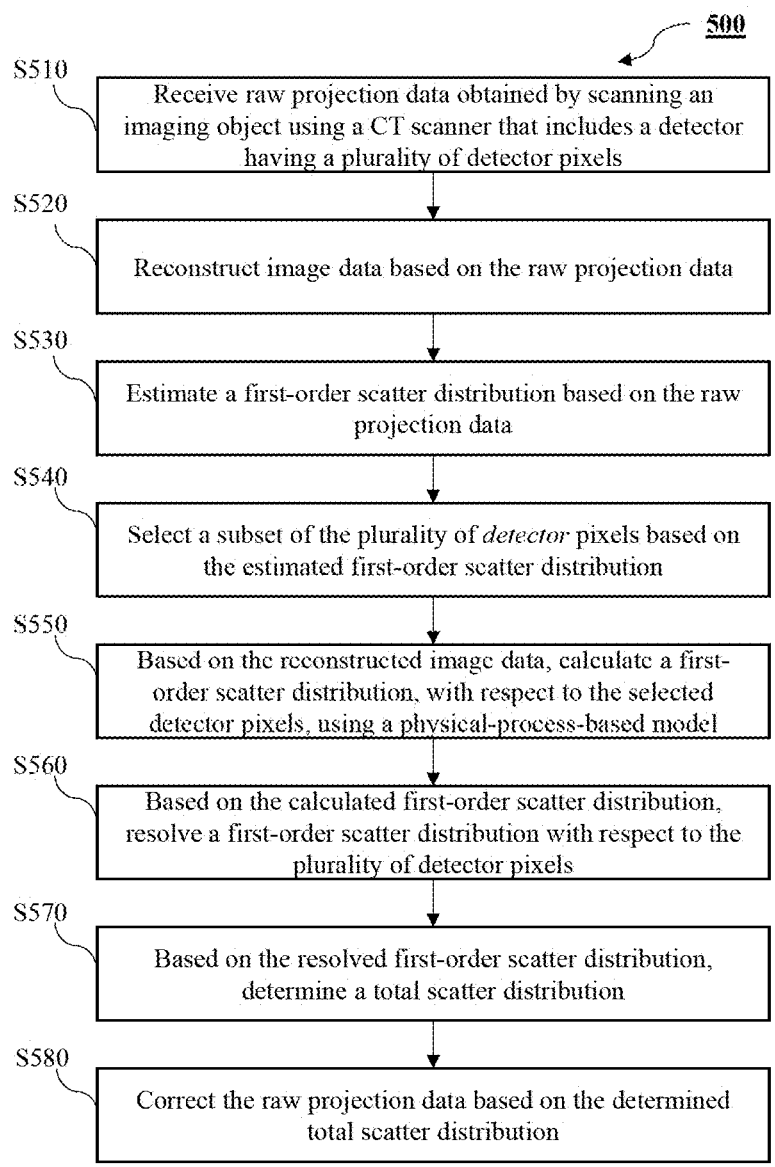
FIG. 5 shows a non-limiting example of a flow chart of a scatter compensation process that estimates a scatter distribution with improved accuracy and reduced processing time, according to one embodiment of the present disclosure.

FIG. 5 shows a non-limiting example of a flow chart of a scatter compensation process 500 that estimates a scatter distribution with improved accuracy and reduced calculation time, according to one embodiment of the present disclosure.

The process 500 starts in step S510 by receiving the raw projection data obtained by scanning the imaging object using the CT apparatus. In step S520, image data is reconstructed from the obtained projection data. As in the embodiment shown in FIGS. 2 and 3, the image reconstruction can be conducted using various methods, including but not limited to, the FBP method.

In step S530, a first-order scatter distribution is estimated based on the raw projection data. For example, a neural network can be utilized to derive a rough estimate of the first-order scatter distribution from the projection data. The resolution of the first-order scatter distribution can be aligned with that of the projection data, or it can be reduced to enable down-sampling. For instance, while the projection data may have resolution of 600×400, the first-order scatter distribution could have lower resolution of 200×100.

Training datasets of the neural network can be collected from simulation, research experiments on phantoms or volunteers, and/or clinical procedures on patients. For instance, physical-model-based simulations, such as those based on the RTE method or the Monte Carlo method, can be carried out using the CT apparatus to generate projection data and associated first-order scatter distributions. These datasets can then be used to train the neural network, allowing it to learn the mapping from projection data to first-order scatter distributions.

In step S540, based on the estimated first-order scatter distribution, a subset of the plurality of detector pixels of the detector is selected. The selection process can be accomplished through adaptive down-sampling using a specific criterion. For example, those detector pixels with local maxima or minima in the first-order scatter values can be selected. Other criteria are also possible, such as those based on the body parts of the imaged object. In addition to these approaches, any other methods that aid in reducing the number of detector pixels and thus improving calculation efficiency can also be applied, including but not limited to, conducting uniform sampling to obtain a subset of the detector pixels.

In step S550, based on the projection data and the reconstructed image data, a first-order scatter distribution is calculated with respect to the selected detector pixels. Any method capable of acquiring a precise scatter distribution can be used here, including but not limited to, physical-model-based methods. Thanks to the adaptive sparse sampling performed in step S540, the first-order scatter distribution is calculated only for the selected detector pixels, resulting in a substantial reduction in processing time.

In step S560, based on the first-order scatter distribution calculated with respect to the selected detector pixels, a first-order scatter distribution is resolved with respect to all detector pixels of the detector. Despite its accuracy, the scatter distribution obtained in step S550 cannot accurately represent the scatter distribution across the entire detector. The resolution in step S560 can be achieved through an interpolation algorithm or via a neural network. For instance, a super-resolution network can be utilized to recover the values for unselected pixels. The input of the network is the first-order scatter distribution for the selected detector pixels, while the target is the scatter distribution for all detector pixels. There are no specific limitations on the network structure or the loss function.

In step S570, a total scatter distribution is determined based on the resolved first-order scatter distribution. This determination can be performed in the same way as described in the embodiment shown in FIGS. 2 and 3. In step S580, the raw projection data can be corrected based on the total scatter distribution determined in step S570. As mentioned above, the process of step S570 is optional and can be omitted, and thus in step S580, the raw projection data can be corrected directly using the first-order scatter distribution resolved in step S560.

Again, a more precise determination of the total scatter distribution can be achieved by using a distribution of the first-order component and one or more higher-order components. This could include a distribution of the first- and second-order scattered components, or of the first-, second-, and third-order scattered components, etc.

Figure 6A:
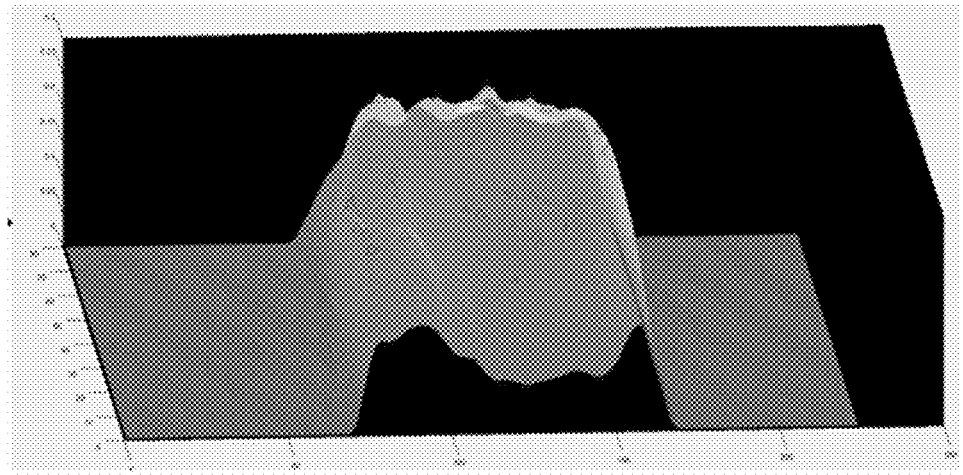
FIGS. 6A and 6B show a non-limiting example of selecting a subset of a plurality of detector pixels included in a detector of a CT apparatus, according to one embodiment of the present disclosure.
Figure 6B:
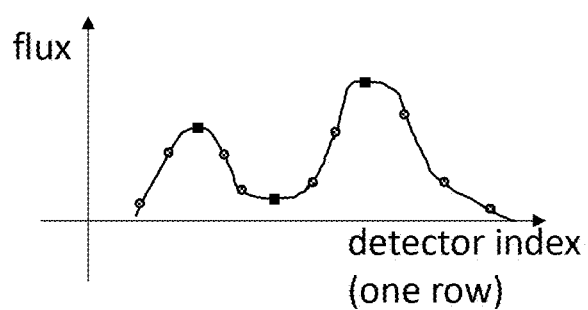

FIGS. 6A and 6B show a non-limiting example of selecting a subset of a plurality of detector pixels included in a detector of a CT apparatus, according to one embodiment of the present disclosure.

As described above, calculating the first-order scatter values only on a limited number of selected detector pixels can be an efficient way to speed up the estimation process. For example, adaptive sparse sampling can be applied, based on the roughly estimated first-order scatter distribution, to determine the positions of the selected detector pixels.

A non-limiting example of the adaptive sparse sampling is shown in FIG. 6A, in which the detector pixels that have local maximum or minimum values are identified. Since the scatter distribution has low frequency characteristics, it changes very slowly. Peak/valley detection algorithms can be used to capture the position of maximum or minimum valued detector pixels.

A non-limiting example of the scatter distribution along one row of the detector pixels is shown in FIG. 6B. If the selected peak/valley pixels (represented by squares in the figure) are too sparse to describe the scatter distribution, more detector pixels (represented by dots in the figure) between the peak and valley regions can be sparsely selected, until the number of the selected detector pixels reaches a predetermined threshold. For example, the threshold can be determined a priori based on the performance of the super resolution network.

Compared with the deep learning methods that perform an end-to-end training between the projection data and the scatter distribution, the embodiment shown in FIGS. 4 and 5 can not just improve the total scatter estimation by using a precisely calculated first-order scatter distribution, but can also reduce the processing time by introducing adaptive detector pixel down-sampling and the super-resolution network.

Figure 7:
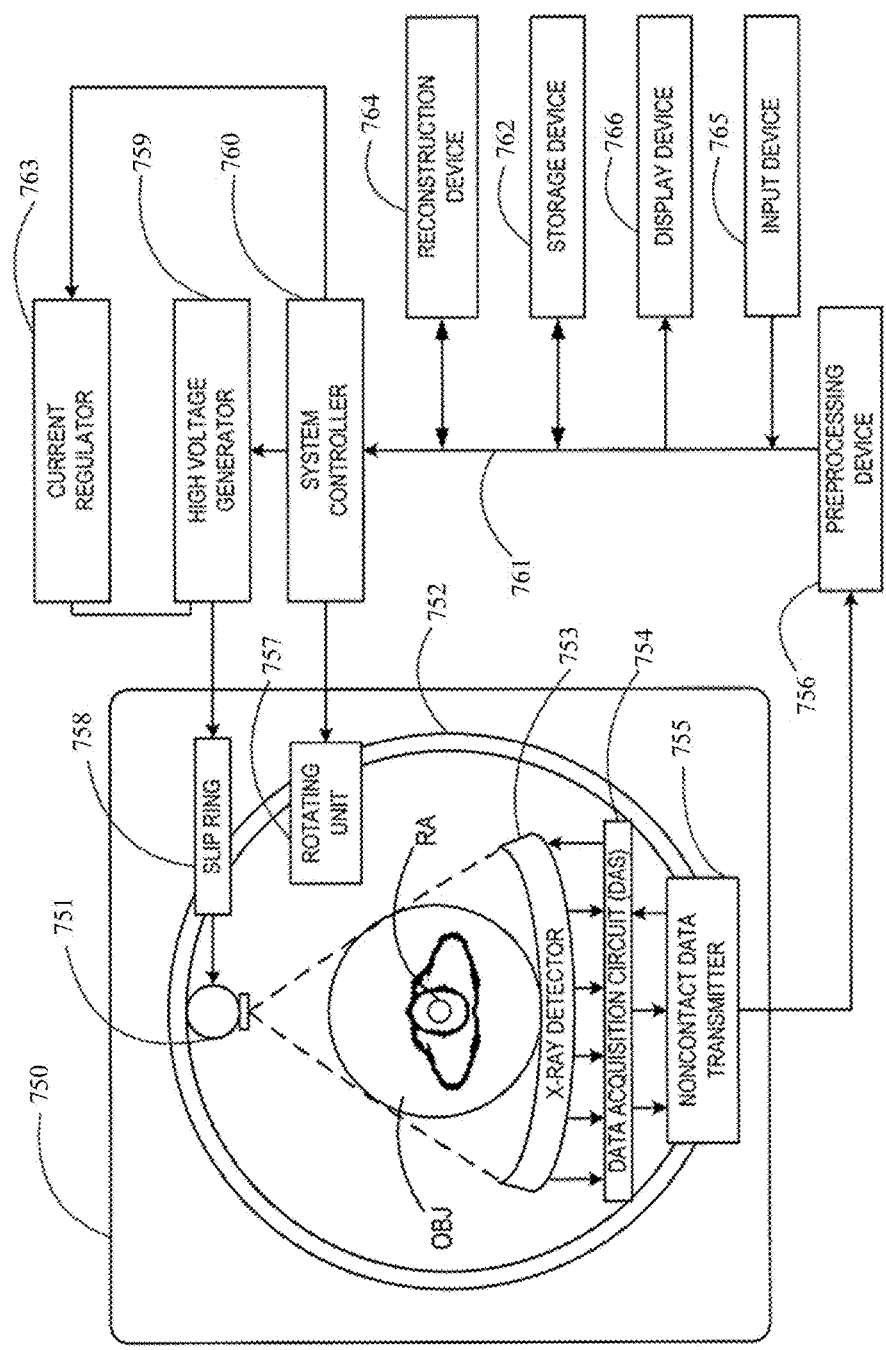
FIG. 7 is a schematic block diagram of a CT apparatus, according to one embodiment of the present disclosure.

FIG. 7 is a schematic block diagram of a CT apparatus or scanner, according to one embodiment of the present disclosure. As shown in FIG. 7, a radiography gantry 750 is illustrated from a side view and further includes an X-ray tube 751, an annular frame 752, and a multi-row or two-dimensional-array-type X-ray detector 753. The X-ray tube 751 and X-ray detector 753 are diametrically mounted across an object OBJ on the annular frame 752, which is rotatably supported around a rotation axis RA. A rotating unit 757 rotates the annular frame 752 at a high speed, such as 0.4 sec/rotation, while the object OBJ is being moved along the axis RA into or out of the illustrated page.

An embodiment of an X-ray CT apparatus according to the present disclosure will be described below with reference to the views of the accompanying drawing. Note that X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present disclosure can be applied to either type. In this case, the rotate/rotate-type, which is currently the mainstream, will be exemplified.

The multi-slice X-ray CT apparatus further includes a high voltage generator 759 that generates a tube voltage applied to the X-ray tube 751 through a slip ring 758 so that the X-ray tube 751 generates X-rays. The X-rays are emitted towards the object OBJ, whose cross-sectional area is represented by a circle. For example, the X-ray tube 751 having an average X-ray energy during a first scan that is less than an average X-ray energy during a second scan. Thus, two or more scans can be obtained corresponding to different X-ray energies. The X-ray detector 753 is located at an opposite side from the X-ray tube 751 across the object OBJ for detecting the emitted X-rays that have transmitted through the object OBJ. The X-ray detector 753 further includes individual detector elements or units.

The CT apparatus further includes other devices for processing the detected signals from the X-ray detector 753. A data acquisition circuit or a Data Acquisition System (DAS) 754 converts a signal output from the X-ray detector 753 for each channel into a voltage signal, amplifies the signal, and further converts the signal into a digital signal. The X-ray detector 753 and the DAS 754 are configured to handle a predetermined total number of projections per rotation (TPPR).

The above-described data is sent to a preprocessing device 756, which is housed in a console outside the radiography gantry 750 through a non-contact data transmitter 755. The preprocessing device 756 performs certain corrections, such as sensitivity correction, on the raw data. A memory 762 stores the resultant data, which is also called projection data at a stage immediately before reconstruction processing. The memory 762 is connected to a system controller 760 through a data/control bus 761, together with a reconstruction device 764, input device 765, and display 766. The system controller 760 controls a current regulator 763 that limits the current to a level sufficient for driving the CT system.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 751 and the X-ray detector 753 are diametrically mounted on the annular frame 752 and are rotated around the object OBJ as the annular frame 752 is rotated about the rotation axis RA. In the fourth-generation geometry system, the detectors are fixedly placed around the patient and an X-ray tube rotates around the patient. In an alternative embodiment, the radiography gantry 750 has multiple detectors arranged on the annular frame 752, which is supported by a C-arm and a stand.

The memory 762 can store the measurement value representative of the irradiance of the X-rays at the X-ray detector unit 753. Further, the memory 762 can store a dedicated program for executing the CT image reconstruction, material decomposition, and motion estimation and motion compensation methods including the methods described herein.

The reconstruction device 764 can execute the above-referenced methods, described herein. Further, reconstruction device 764 can execute pre-reconstruction processing image processing such as volume rendering processing and image difference processing as needed.

The pre-reconstruction processing of the projection data performed by the preprocessing device 756 can include correcting for detector calibrations, detector nonlinearities, and polar effects, for example.

Post-reconstruction processing performed by the reconstruction device 764 can include filtering and smoothing the image, volume rendering processing, and image difference processing, as needed. The image reconstruction process can be performed using filtered back projection, iterative image reconstruction methods, or stochastic image reconstruction methods. The reconstruction device 764 can use the memory to store, e.g., projection data, reconstructed images, calibration data and parameters, and computer programs.

The reconstruction device 764 can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VDHL, Verilog, or any other hardware description language and the code may be stored in an electronic memory directly within the FPGA or CPLD, or as a separate electronic memory. Further, the memory 762 can be non-volatile, such as ROM, EPROM, EEPROM or FLASH memory. The memory 762 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction device 764 can execute a computer program including a set of computer-readable instructions that perform the functions described herein, the program being stored in any of the above-described non-transitory electronic memories and/or a hard disc drive, CD, DVD, FLASH drive or any other known storage media. Further, the computer-readable instructions may be provided as a utility application, background daemon, or component of an operating system, or combination thereof, executing in conjunction with a processor, such as a Xeon processor from Intel of America or an Opteron processor from AMD of America and an operating system, such as Microsoft 10, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display 766. The display 766 can be an LCD display, CRT display, plasma display, OLED, LED or any other display known in the art.

The memory 762 can be a hard disk drive, CD-ROM drive, DVD drive, FLASH drive, RAM, ROM or any other electronic storage known in the art.

Numerous modifications and variations are possible in light of the above teachings. It is therefore to be understood that within the scope of the appended claims, the disclosure can be practiced otherwise than as specifically described herein.

Embodiments of the present disclosure may also be as set forth in the following parentheticals.

(1) A method for performing scatter estimation in a computed tomography (CT) system including a detector having a plurality of detector pixels, comprising: obtaining projection data by scanning an imaging object using the CT system; reconstructing image data from the obtained projection data; estimating, based on the obtained projection data, a first scatter distribution; selecting, based on the estimated first scatter distribution, a first subset of the plurality of detector pixels; calculating, based on the obtained projection data and the reconstructed image data, a second scatter distribution with respect to the selected first subset of the plurality of detector pixels, the calculated second scatter distribution having higher accuracy than the estimated first scatter distribution; acquiring, based on the calculated second scatter distribution, a third scatter distribution with respect to a second subset of the plurality of detector pixels, so that the acquired third scatter distribution has higher spatial resolution than the calculated second scatter distribution, where the second subset includes the first subset.

(2) The method of (1), further comprising determining, based on the acquired third scatter distribution, a fourth scatter distribution, wherein the determined fourth scatter distribution has higher accuracy and includes higher order scattered components compared with the estimated first scatter distribution.

(3) The method of (2), wherein the estimating step further comprises estimating, as the estimated first scatter distribution, a distribution with respect to a first-order scattered component of the scattered radiation, where the first-order scattered component is caused by single-scattering events that occur in the imaging object, and the determining step further comprises determining a total scatter distribution as the determined fourth scatter distribution, where the total scatter distribution is with respect to the first-order scattered component and all higher-order components of the scattered radiation, and each of the higher-order scattered components is caused by corresponding multiple-scattering events that occur in the imaging object.

(4) The method of (3), wherein the estimating step further comprises estimating, as the estimated first scatter distribution, a distribution with respect to the first-order scattered component and a second-order scattered component of the scattered radiation, where the second-order scattered component is caused by double-scattering events that occur in the imaging object.

(5) The method of (3), wherein the estimating step further comprises estimating, as the estimated first scatter distribution, a distribution with respect to the first-order scattered component, a second-order scattered component, and a third-order scattered component of the scattered radiation, where the second-order scattered component is caused by double-scattering events that occur in the imaging object, and the third-order scattered component is caused by triple-scattering events that occur in the imaging object.

(6) The method of (3), wherein the determining step further comprises: inputting the acquired third scatter distribution to a trained neural network; and obtaining, as the determined fourth scatter distribution, an output of the trained neural network.

(7) The method of (6), further comprising: performing physical-process-based simulation with the CT system to generate, as training datasets for the neural network, different distributions with respect to the first-order scattered component and corresponding total scatter distributions; and training the neural network with the generated training datasets to learn a mapping between the different distributions with respect to the first-order scattered component and the corresponding total scatter distributions.

(8) The method of (1), wherein the estimated first scatter distribution has a coarser granularity compared with the obtained projection data.

(9) The method of (1), wherein the estimating step further comprises: inputting the obtained projection data to a trained neural network; and obtaining, as the estimated first scatter distribution, an output of the trained neural network.

(10) The method of (7), further comprising: performing physical-process-based simulation with the CT system to generate, as training datasets for the neural network, different projection data and corresponding scatter distributions; and training the neural network with the generated training datasets to learn a mapping between the different projection data and the corresponding scatter distributions.

(11) The method of (1), wherein the selecting step further comprises down-sampling, based on a predetermined criterion, the plurality of detector pixels to obtain the selected first subset of the plurality of detector pixels.

(12) The method of (11), wherein the down-sampling step further comprises generating the selected first subset of the plurality of detector pixels by determining a number of detector pixels at each of which the estimated first scatter distribution has a local maximum or a local minimum.

(13) The method of (12), wherein the generating step further comprises adding, in response to sparsity of detector pixels in the selected first subset of the plurality of detector pixels being beyond a predetermined threshold, another number of detector pixels into the selected first subset of the plurality of detector pixels, until a total number of the detector pixels in the selected first subset of the plurality of detector pixels reaches a predetermined number.

(14) The method of (1), wherein the calculating step further comprises conducting physical-process-based simulation to generate the calculated second scatter distribution.

(15) The method of (14), wherein the conducting step further comprises conducting the simulation based on a radiative transfer equation (RTE) method or a Monte Carlo method.

(16) A method for performing scatter estimation in a computed tomography (CT) system, comprising: obtaining projection data by scanning an imaging object using the CT system; reconstructing image data from the obtained projection data; calculating, based on the obtained projection data and the reconstructed image data, a first scatter distribution, using a physical-process-based model; and determining, based on the calculated first scatter distribution, a second scatter distribution, where the determined second scatter distribution includes higher order scattered components compared with the calculated first scatter distribution.

(17) The method of (16), wherein the calculating step further comprises calculating, as the calculated first scatter distribution, a distribution with respect to a first-order scattered component of the scattered radiation, where the first-order scattered component is caused by single-scattering events that occur in the imaging object, and the determining step further comprises determining a total scatter distribution as the determined second scatter distribution, where the total scatter distribution is with respect to the first-order scattered component and all higher-order components of the scattered radiation, and each of the higher-order scattered components is caused by corresponding multiple-scattering events that occur in the imaging object.

(18) The method of (17), wherein the calculating step further comprises calculating, as the calculated first scatter distribution, a distribution with respect to the first-order scattered component and a second-order scattered component of the scattered radiation, where the second-order scattered component is caused by double-scattering events that occur in the imaging object.

(19) The method of (17), wherein the calculating step further comprises calculating, as the calculated first scatter distribution, a distribution with respect to the first-order scattered component, a second-order scattered component, and a third-order scattered component of the scattered radiation, where the second-order scattered component is caused by double-scattering events that occur in the imaging object, and the third-order scattered component is caused by triple-scattering events that occur in the imaging object.

(20) An apparatus for performing scatter estimation in a computed tomography (CT) system including a detector having a plurality of detector pixels, the apparatus comprising processing circuitry configured to: obtain projection data by scanning an imaging object using the CT system; reconstruct image data from the obtained projection data; estimate, based on the obtained projection data, a first scatter distribution; select, based on the estimated first scatter distribution, a first subset of the plurality of detector pixels; calculate, based on the obtained projection data and the reconstructed image data, a second scatter distribution with respect to the selected first subset of the plurality of detector pixels, the calculated second scatter distribution having higher accuracy than the estimated first scatter distribution; acquire, based on the calculated second scatter distribution, a third scatter distribution with respect to a second subset of the plurality of detector pixels, so that the acquired third scatter distribution has higher spatial resolution than the calculated second scatter distribution, where the second subset includes the first subset.

Those skilled in the art will also understand that there can be many variations made to the operations of the techniques explained above while still achieving the same objectives of the disclosure. Such variations are intended to be covered by the scope of this disclosure. As such, the foregoing descriptions of embodiments of the disclosure are not intended to be limiting. Rather, any limitations to embodiments of the disclosure are presented in the following claims.

What is claimed is:

1. A method for performing scatter estimation in a computed tomography (CT) system including a detector having a plurality of detector pixels, comprising:
    obtaining projection data by scanning an imaging object using the CT system;
    reconstructing image data from the obtained projection data;
    estimating, based on the obtained projection data, a first scatter distribution;
    selecting, based on the estimated first scatter distribution, a first subset of the plurality of detector pixels;
    calculating, based on the obtained projection data and the reconstructed image data, a second scatter distribution with respect to the selected first subset of the plurality of detector pixels, the calculated second scatter distribution having higher accuracy than the estimated first scatter distribution; and
    acquiring, based on the calculated second scatter distribution, a third scatter distribution with respect to a second subset of the plurality of detector pixels, so that the acquired third scatter distribution has higher spatial resolution than the calculated second scatter distribution, where the second subset includes the first subset,
    wherein the selecting step further comprises down-sampling, based on a predetermined criterion, the plurality of detector pixels to obtain the selected first subset of the plurality of detector pixels, and
    the down-sampling step further comprises generating the selected first subset of the plurality of detector pixels by determining a number of detector pixels at each of which the estimated first scatter distribution has a local maximum or a local minimum.

2. The method of claim 1, further comprising:
    determining, based on the acquired third scatter distribution, a fourth scatter distribution, wherein the determined fourth scatter distribution has higher accuracy and includes higher order scattered components compared with the estimated first scatter distribution.

3. The method of claim 2, wherein the estimating step further comprises estimating, as the estimated first scatter distribution, a distribution with respect to a first-order scattered component of the scattered radiation, where the first-order scattered component is caused by single-scattering events that occur in the imaging object, and the determining step further comprises determining a total scatter distribution as the determined fourth scatter distribution, where the total scatter distribution is with respect to the first-order scattered component and all higher-order components of the scattered radiation, and each of the higher-order scattered components is caused by corresponding multiple-scattering events that occur in the imaging object.

4. The method of claim 3, wherein the estimating step further comprises estimating, as the estimated first scatter distribution, a distribution with respect to the first-order scattered component and a second-order scattered component of the scattered radiation, where the second-order scattered component is caused by double-scattering events that occur in the imaging object.

5. The method of claim 3, wherein the estimating step further comprises estimating, as the estimated first scatter distribution, a distribution with respect to the first-order scattered component, a second-order scattered component, and a third-order scattered component of the scattered radiation, where the second-order scattered component is caused by double-scattering events that occur in the imaging object, and the third-order scattered component is caused by triple-scattering events that occur in the imaging object.

6. The method of claim 3, wherein the determining step further comprises:
    inputting the acquired third scatter distribution to a trained neural network; and
    obtaining, as the determined fourth scatter distribution, an output of the trained neural network.

7. The method of claim 6, further comprising:
    performing physical-process-based simulation with the CT system to generate, as training datasets for the neural network, different distributions with respect to the first-order scattered component and corresponding total scatter distributions; and
    training the neural network with the generated training datasets to learn a mapping between the different distributions with respect to the first-order scattered component and the corresponding total scatter distributions.

8. The method of claim 7, further comprising:
    performing physical-process-based simulation with the CT system to generate, as training datasets for the neural network, different projection data and corresponding scatter distributions; and
    training the neural network with the generated training datasets to learn a mapping between the different projection data and the corresponding scatter distributions.

9. The method of claim 1, wherein the estimated first scatter distribution has a coarser granularity compared with the obtained projection data.

10. The method of claim 1, wherein the estimating step further comprises:
    inputting the obtained projection data to a trained neural network; and
    obtaining, as the estimated first scatter distribution, an output of the trained neural network.

11. The method of claim 1, wherein the generating step further comprises adding, in response to sparsity of detector pixels in the selected first subset of the plurality of detector pixels being beyond a predetermined threshold, another number of detector pixels into the selected first subset of the plurality of detector pixels, until a total number of the detector pixels in the selected first subset of the plurality of detector pixels reaches a predetermined number.

12. The method of claim 1, wherein the calculating step further comprises conducting physical-process-based simulation to generate the calculated second scatter distribution.

13. The method of claim 12, wherein the conducting step further comprises conducting the simulation based on a radiative transfer equation (RTE) method or a Monte Carlo method.

14. A method for performing scatter estimation in a computed tomography (CT) system, comprising:
obtaining projection data by scanning an imaging object using the CT system;
reconstructing image data from the obtained projection data;
calculating, based on the obtained projection data and the reconstructed image data, a first scatter distribution, using a physical-process-based model; and
determining, based on the calculated first scatter distribution, a second scatter distribution, where the determined second scatter distribution includes higher order scattered components compared with the calculated first scatter distribution.

15. The method of claim 14, wherein the calculating step further comprises calculating, as the calculated first scatter distribution, a distribution with respect to a first-order scattered component of the scattered radiation, where the first-order scattered component is caused by single-scattering events that occur in the imaging object, and
the determining step further comprises determining a total scatter distribution as the determined second scatter distribution, where the total scatter distribution is with respect to the first-order scattered component and all higher-order components of the scattered radiation, and each of the higher-order scattered components is caused by corresponding multiple-scattering events that occur in the imaging object.

16. The method of claim 15, wherein the calculating step further comprises calculating, as the calculated first scatter distribution, a distribution with respect to the first-order scattered component and a second-order scattered component of the scattered radiation, where the second-order scattered component is caused by double-scattering events that occur in the imaging object.

17. The method of claim 15, wherein the calculating step further comprises calculating, as the calculated first scatter distribution, a distribution with respect to the first-order scattered component, a second-order scattered component, and a third-order scattered component of the scattered radiation, where the second-order scattered component is caused by double-scattering events that occur in the imaging object, and the third-order scattered component is caused by triple-scattering events that occur in the imaging object.

18. An apparatus for performing scatter estimation in a computed tomography (CT) system including a detector having a plurality of detector pixels, the apparatus comprising:
processing circuitry configured to
obtain projection data by scanning an imaging object using the CT system;
reconstruct image data from the obtained projection data;
estimate, based on the obtained projection data, a first scatter distribution;
select, based on the estimated first scatter distribution, a first subset of the plurality of detector pixels;
calculate, based on the obtained projection data and the reconstructed image data, a second scatter distribution with respect to the selected first subset of the plurality of detector pixels, the calculated second scatter distribution having higher accuracy than the estimated first scatter distribution; and
acquire, based on the calculated second scatter distribution, a third scatter distribution with respect to a second subset of the plurality of detector pixels, so that the acquired third scatter distribution has higher spatial resolution than the calculated second scatter distribution, where the second subset includes the first subset,
wherein the processing circuitry is further configured to select the first subset by down-sampling, based on a predetermined criterion, the plurality of detector pixels to obtain the selected first subset of the plurality of detector pixels, and
the processing circuitry is further configured to down-sample the plurality of detector pixels by generating the selected first subset of the plurality of detector pixels by determining a number of detector pixels at each of which the estimated first scatter distribution has a local maximum or a local minimum.

* * * * *